Patented July 8, 1941

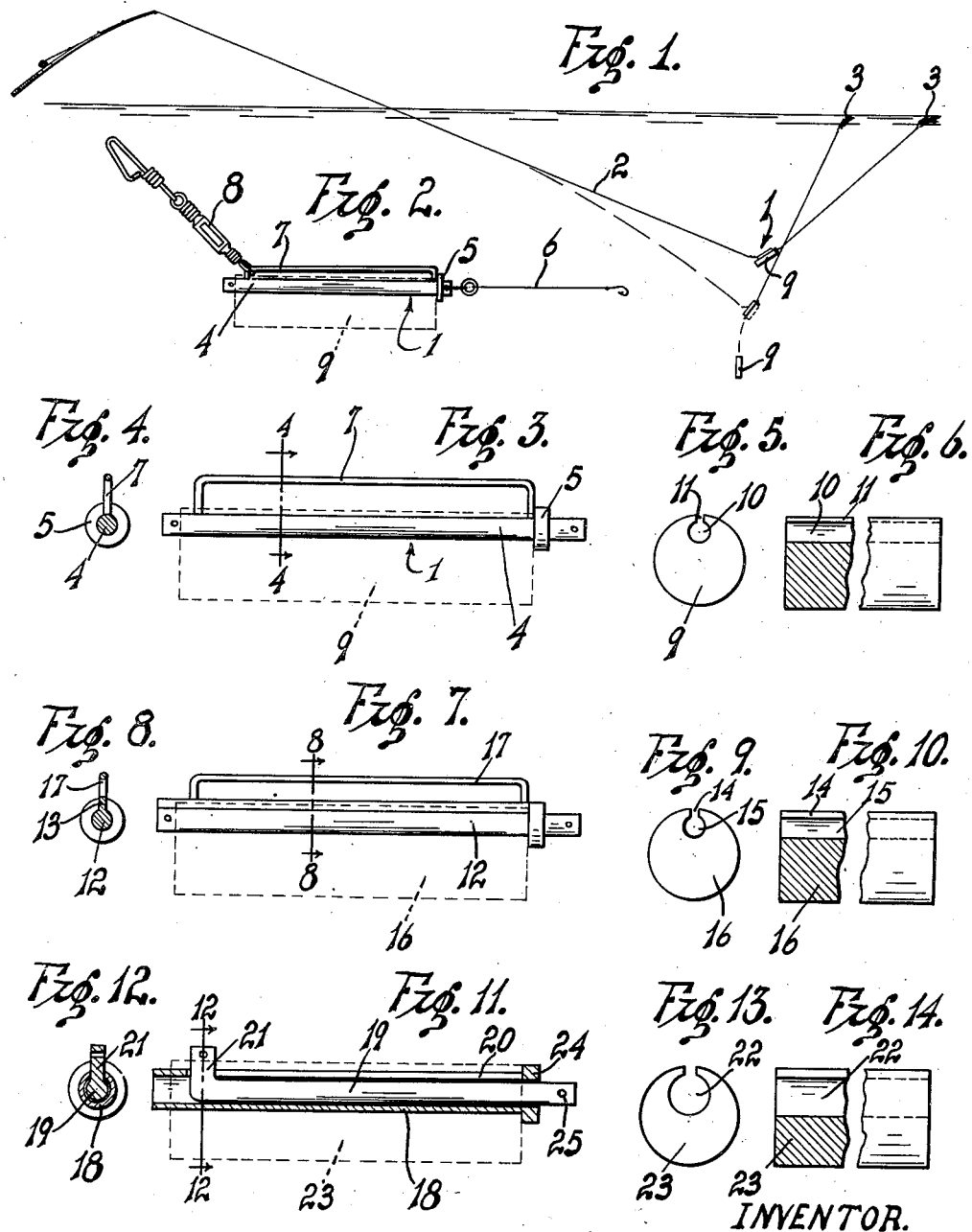

2,248,258

UNITED STATES PATENT OFFICE 2,248,258

RELEASABLE CASTING WEIGHT

Harry W. Waldbillig, Long Beach, Calif.

Application January 6, 1940, Serial No. 312,708

7 Claims. (Cl. 43—52)

This invention relates to a releasable casting weight particularly useful in connection with live bait fishing although my weight can be used in connection with other baits, as well as artificial lures, flies, and the like.

An object of my invention is to provide a novel releasable casting weight, which automatically drops off of the line once the line has been cast.

Another object is to provide a novel releasable casting weight, which can be quickly and easily placed on the line prior to casting, and after the line has been cast and the weight strikes the water, this weight will be automatically dumped or released from the line so that the fisherman can play a fish without the drag of the casting weight.

A further object is to provide a casting weight of the character stated, which is inexpensive to manufacture, effective in operation and practical in use.

Other objects, advantages and features of invention may appear from the accompanying drawing, the subjoined detailed description, and the appended claims.

In the drawing:

Figure 1 is a diagrammatic side elevation of my releasable casting weight on a casting line, and illustrating its use.

Figure 2 is a side elevation of the mounting bar with the line-attaching means mounted thereon.

Figure 3 is an enlarged side elevation of the weight bar with the line-attaching means removed.

Figure 4 is a sectional view taken on line 4—4 of Figure 3.

Figure 5 is an end view of the weight.

Figure 6 is a fragmentary, side elevation of the weight, with parts broken away to show interior construction.

Figure 7 is a side elevation of a modified form of weight bar.

Figure 8 is a sectional view taken on line 8—8 of Figure 7.

Figure 9 is an end view of the weight used in connection with the bar shown in Figure 7.

Figure 10 is a fragmentary side elevation of the weight shown in Figure 9, with parts broken away to show interior construction.

Figure 11 is a longitudinal, sectional view of still another modified type of weight bar.

Figure 12 is a sectional view taken on line 12—12 of Figure 11.

Figure 13 is an end view of the weight used in connection with the bar shown in Figure 11.

Figure 14 is a fragmentary side elevation of the weight, illustrated in Figure 13.

Referring more particularly to the drawing, my releasable casting weight 1 is mounted adjacent the outer end of the usual fishing line 2, but spaced a suitable distance from the hook containing the lure, such as the live bait 3. Due to the fact that the lure or bait 3 is considerably lighter than the weight 1, after the line has been cast it will assume a position shown in solid lines in Figure 1. Thereafter, the weight will continue to drop while the lure will drag behind, thus causing the casting weight to be upended, permitting the weight to drop off, as shown in dotted lines in Figure 1.

The casting weight consists of a bar 4, on the outer end of which a stop shoulder 5 is provided. The hook line 6 is suitably attached to the outer end of the bar 4 by suitable means, such as a ring, swivel, or the like. A rod 7 is fixedly mounted on the bar 4, and is spaced somewhat from this bar, substantially as shown in Figures 2 and 3. The pole line 2 is slidably mounted on the rod 7 by means of the ring or swivel 8. The eye of the ring or swivel slides along the rod 7 after the line has been cast, and to permit the weight to slide off of the bar 4, as will be further described.

A weight 9 is provided with a bore or opening 10, adjacent its outer edge. A groove 11 extends into the bore 10 to permit the weight to slide onto the bar 4, and over the ends of the rod 7, thus enabling the weight to slide off of the bar 4 when this bar is tilted upwardly, as shown in Figure 1. When the line is cast, the weight 9 normally bears against the shoulder 5. After the line is cast, as previously described, the weight 9 will drop in the water more rapidly than the lure or live bait 3. Consequently, the pole line attached to the swivel 8 will slide towards the outer end of the bar 4, that is, towards the shoulder 5. This causes the bar 4 to assume a nearly vertical position, and the weight 9 will slide off the rear end of the bar, thus releasing the weight from the line. It is to be noted that the bore 10 is eccentric in the weight 9, thus the center of gravity of the weight is below the bar 4 and the weight will always hang properly so that it can easily slide off of the bar.

In Figures 7 to 10 inclusive, I have disclosed a modified form of bar 12, which is provided with a longitudinal flange 13, said flange being adapted to fit into the groove 14, extending into the bore 15 of the weight 16. The guide rod 17 is mounted on the bar 12 in the same manner as previously described.

In Figures 11 to 14 inclusive, I have disclosed another modified form of releasable casting weight, consisting of an outer sleeve 18, which is slidably mounted on the bar 19. The sleeve 18 is provided with a longitudinal slot 20, and the upturned end 21 of the bar 19 extends into this slot and is slidable therein. The bore 22 of the weight 23 fits over the sleeve 18, and in casting position rests against the shoulder 24. The hook line is attached to the outer end of the bar 19 at 25, and the pole line is attached to the upstanding ear 21. When the bar 19 is moved into substantially vertical position in the water, as previously described, the sleeve 18 will slide along the bar 19 until the shoulder 24 strikes the upturned end or ear 21. The weight 23 is then released to permit the angler to play a fish with greater freedom.

Having described my invention, I claim:

1. A releasable casting weight comprising a bar, a weight slidably mounted on said bar, said weight being free to slip off of the bar when the bar is tilted, means on one end of the bar to receive a hook line, and means on the other end of the bar to receive a pole line, said means to receive a pole line being slidably mounted relative to the bar.

2. A releasable casting weight comprising a bar, a rod mounted on the bar and spaced therefrom, a weight slidably mounted on the bar, means on one end of the bar attachable to a hook line, and means slidably mounted on the rod attachable to a pole line.

3. A releasable casting weight comprising a bar, a weight, said weight having a bore extending longitudinally thereof, said bore being eccentric in the weight, said weight having a slot extending into the bore, said weight being free to slip off of the bar when the bar is tilted, means on one end of the bar attachable to a hook line, means on the other end of the bar attachable to a pole line, said pole line attaching means being longitudinally slidable relative to the bar.

4. A releasable casting weight for fish lines comprising a bar, a flange on the bar, a rod spaced from the bar and mounted thereon, a weight, said weight having a bore extending longitudinally thereof, and a slot extending into the bore, said bore being adapted to receive the bar and said flange extending into the slot, means on one end of the bar securable to a hook line, and means on the rod securable to a pole line.

5. A releasable casting weight for fish lines comprising a bar, a flange on the bar, a rod spaced from the bar and mounted thereon, a weight, said weight having a bore extending longitudinally thereof, and a slot extending into the bore, said bore being adapted to receive the bar and said flange extending into the slot, means on one end of the bar securable to a hook line, and means on the rod securable to a pole line, said attaching means on the rod being slidable on said rod.

6. A releasable casting weight for fishing lines comprising a bar, a sleeve slidably mounted on said bar, said sleeve sliding longitudinally of the bar, a weight, said weight having a bore extending longitudinally thereof, said sleeve fitting into the bore, said weight being free to slip off of the sleeve when the sleeve is tilted, means on one end of the bar to which the hook line is attached, and means on the other end of the bar to which the pole line is attached.

7. A releasable casting weight for fishing lines comprising a bar, a sleeve slidably mounted on said bar, said sleeve sliding longitudinally of the bar, a weight, said weight having a bore extending longitudinally thereof, said sleeve fitting into the bore, means on one end of the bar to which the hook line is attached, and means on the other end of the bar to which the pole line is attached, said sleeve having a slot extending longitudinally thereof, an ear on the bar extending upwardly through the slot, the pole line being attachable to said ear.

HARRY W. WALDBILLIG.